United States Patent [19]

Van Selous

[11] Patent Number: 4,930,376
[45] Date of Patent: Jun. 5, 1990

[54] MINIMIZING DELAY IN LOW TEMPERATURE ENGAGEMENT OF AUTOMATIC TRANSMISSION CLUTCH OR BRAKE

[75] Inventor: Joseph S. Van Selous, Highland, Mich.

[73] Assignee: Ford Motor Company, Dearborn, Mich.

[21] Appl. No.: 239,379

[22] Filed: Sep. 1, 1988

[51] Int. Cl.⁵ .............................................. B60K 41/04
[52] U.S. Cl. ....................................................... 74/867
[58] Field of Search ................... 74/867, 868, 878, 861

[56] References Cited

U.S. PATENT DOCUMENTS

| | | | |
|---|---|---|---|
| 3,340,895 | 9/1967 | Osgood, Jr. et al. | 137/596 |
| 3,393,585 | 7/1968 | Pierce | 74/864 |
| 3,541,885 | 11/1970 | Burcz | 74/720 |
| 3,583,422 | 6/1971 | Dach et al. | 137/116.3 |
| 3,593,599 | 7/1971 | Dach | 74/869 |
| 3,613,484 | 10/1971 | Pierce et al. | 74/864 X |
| 3,706,240 | 12/1972 | Borneman et al. | 74/869 |
| 3,714,836 | 2/1973 | Pierce et al. | 74/869 X |
| 3,820,417 | 6/1974 | Allen et al. | 74/733 |
| 3,871,250 | 3/1975 | Miyauchi et al. | 74/867 X |
| 4,005,620 | 2/1977 | Dach et al. | 74/865 |
| 4,145,937 | 3/1979 | Shindo et al. | 74/867 |
| 4,227,597 | 10/1980 | Gierer | 192/3.33 |
| 4,265,346 | 5/1981 | Emmadi | 192/0.034 |
| 4,418,587 | 12/1983 | Kauffman | 74/867 |
| 4,462,280 | 7/1984 | Sugano et al. | 74/867 X |
| 4,756,213 | 7/1988 | Mainquist et al. | 74/867 X |

FOREIGN PATENT DOCUMENTS 2061422  5/1981  United Kingdom .................. 74/867

OTHER PUBLICATIONS

U.S. Ser. No. 24,500 filed Mar. 11, 1987.
U.S. Ser. No. 927,624 filed Nov. 6, 1984.

Primary Examiner—Dwight G. Diehl
Assistant Examiner—Chris Campbell
Attorney, Agent, or Firm—Frank G. McKenzie; Donald J. Harrington

[57] ABSTRACT

A system for pressurizing a friction element of an automatic transmission supplied concurrently from two hydraulic passages through a shuttle valve where the two sources of supply pressure are combined. A control valve proeduces regulated output pressure by balancing control feedback pressure against a spring force without venting any portion of the system. The shuttle valve includes a shuttle ball for sealing ports connected to both supply sources and maintains an open connection between the direct clutch and a pocket in which the shuttle ball is retained. AN accumulator includes a plunger separating first and second volumes. One volume expands as hydraulic fluid at regulated output pressure exits the control valve. The volume expands at a regulated time rate controlled by the magnitude of TVLM control pressure, a compression spring force and the flow rate through an orifice of predetermined size.

19 Claims, 2 Drawing Sheets

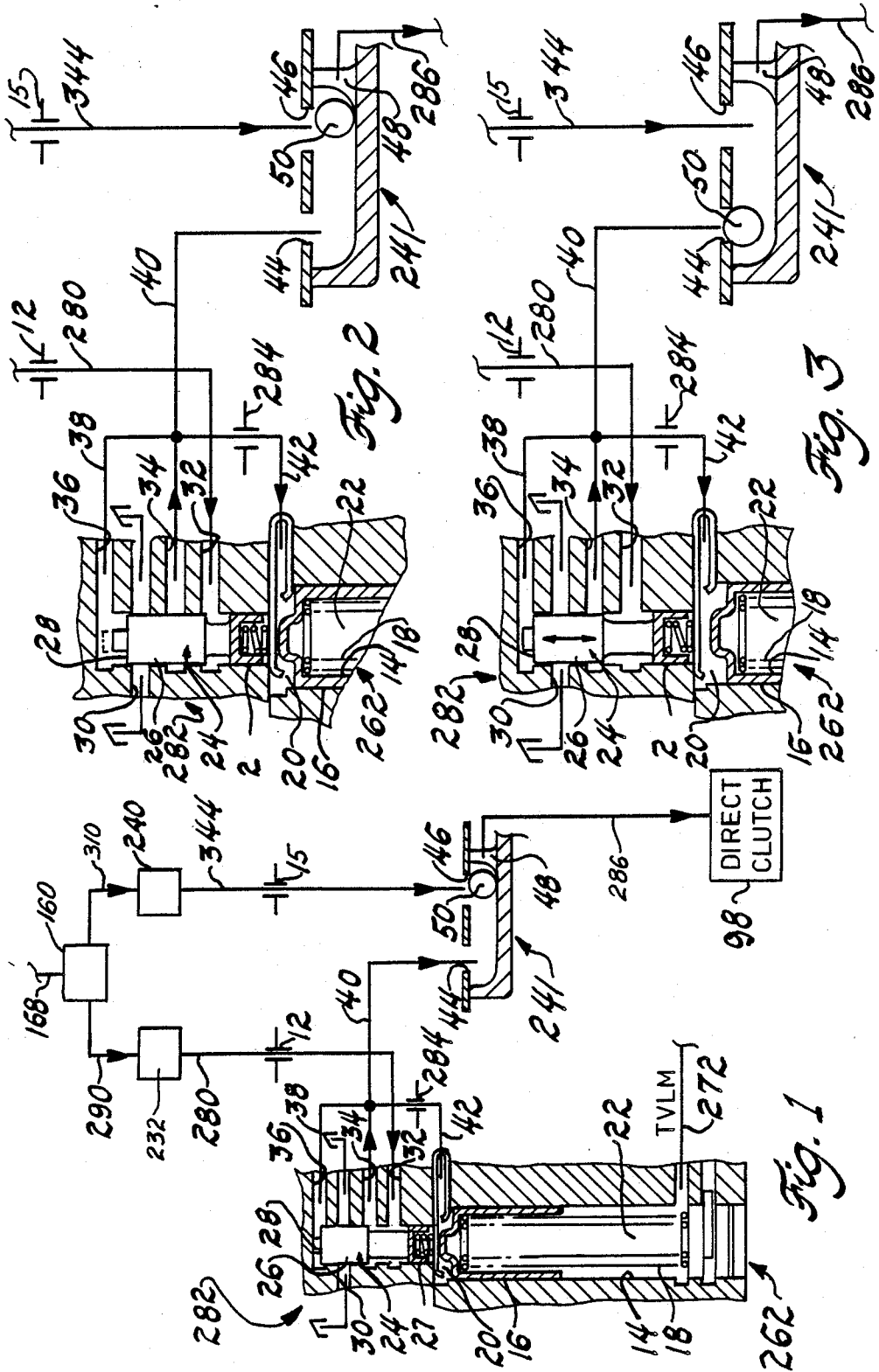

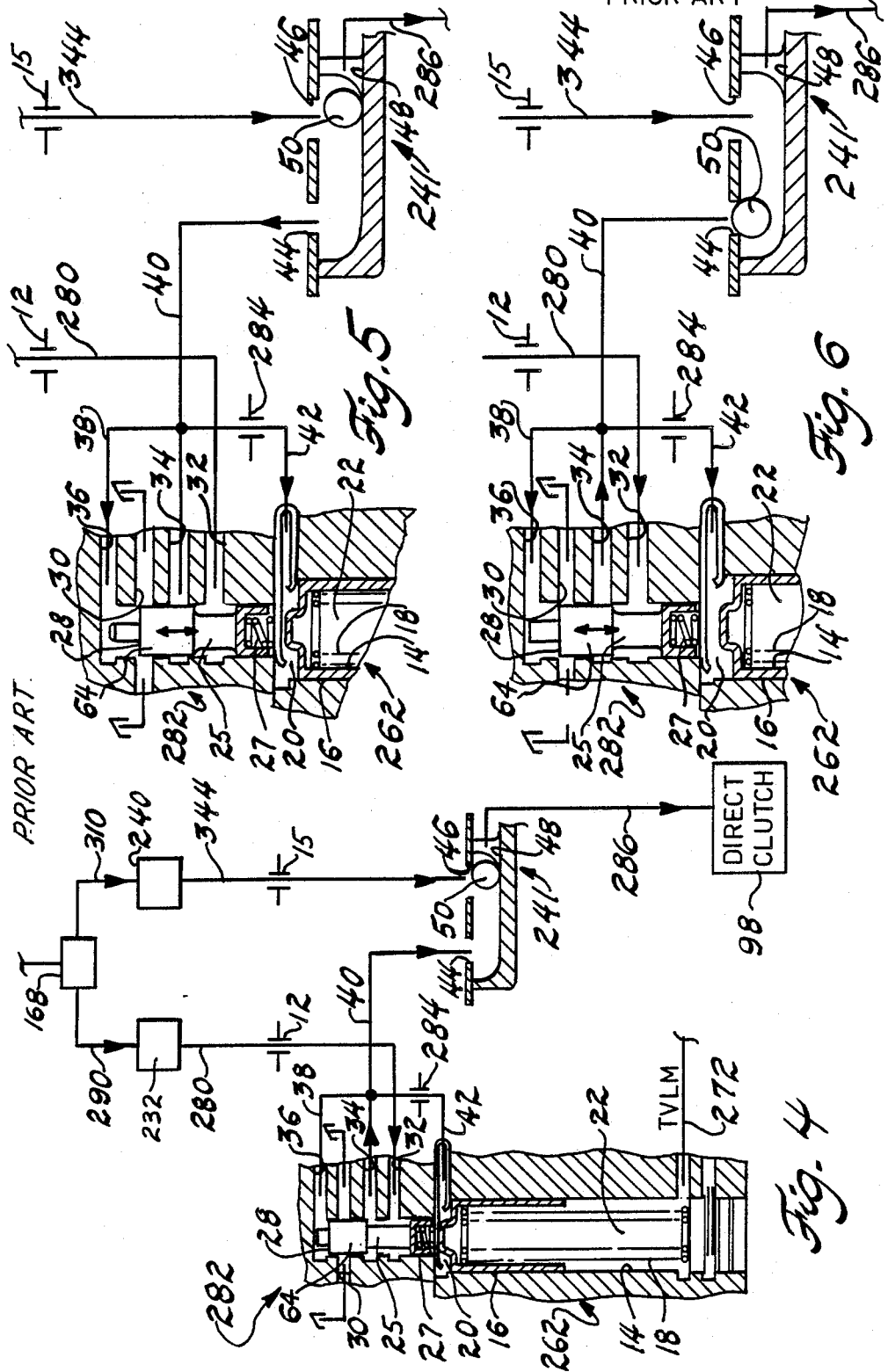

MINIMIZING DELAY IN LOW TEMPERATURE ENGAGEMENT OF AUTOMATIC TRANSMISSION CLUTCH OR BRAKE

BACKGROUND OF THE INVENTION

1. Field of the Invention

This invention relates to a hydraulic control system for an automatic transmission, especially to such a system for pressurizing a clutch rapidly during low temperature or high load conditions, and at a controlled lower rate at normal temperature and normal load conditions.

2. Description of the Prior Art

The period during which a gearshift is made by an automatic transmission from any forward gear to reverse, or from reverse to a forward gear must extend no longer than five to ten seconds under any condition and should be shorter than that at ambient temperature above 0° F. Such transmissions prevent sudden, harsh gear engagements by controlling the time rate at which pressure rises in a clutch or brake required to complete the gearshift. However, when power demand is high and at other conditions producing high throttle valve pressure, the clutch or brake must engage rapidly to meet operator expectations. When temperature is low and viscosity of transmission fluid is high, engagements are inherently sluggish because of delay in filling the clutch cylinder due to flow resistance.

To produce smooth rapid gearshifts at all temperatures, and rapid clutch engagements at high throttle valve pressure conditions, the hydraulic control circuit supplies fluid to the clutch through multiple control valves arranged in parallel and through a shuttle valve where fluid from both control valves combines to produce a single fluid source connected to the cylinder of the clutch. One pressure source supplies the control valve of an accumulator used during forward upshifts and low-power reverse engagement at normal ambient temperature. To control the time rate at which pressure increases within the clutch at normal throttle valve pressure, the clutch is supplied exclusively from the output of the control valve associated with the accumulator.

However, at high power conditions, e.g., when the accelerator pedal of the vehicle is depressed substantially, the throttle valve is opened a substantial amount, engine speed is high, vehicle speed is high, or ambient temperature is low, then a throttle valve produces high pressure output, which causes a second source of hydraulic pressure, not associated with accumulator operation, to be connected to the shuttle valve and clutch. When throttle valve pressure is low, the clutch is supplied from the hydraulic circuit that includes the accumulator and its associated control valve. But, when throttle valve pressure is high, the control senses need for rapid engagement of the clutch and connects an auxiliary fluid pressure source to the shuttle valve to avoid delay in engagement.

The accumulator control valve regulates supply pressure by balancing a control feedback pressure force against a spring force, vents regulated output pressure when feedback pressure is high, and closes the opening to vent when feedback pressure is again low. However, when ambient temperature is cold, viscosity of hydraulic fluid within the shuttle valve is high. This delays, and may prevent entirely, closure of a shuttle valve port connected to the accumulator control valve. This port remains open while the control valve is regulating. The clutch cylinder and shuttle valve are successively opened and closed to vent while the accumulator control valve regulates output pressure.

In the early stage of clutch engagement, clearances among friction discs within the clutch are taken up as the clutch cylinder is filled at low pressure. During this period, while the shuttle valve is open to the control valve and the control valve is regulating, instead of the clutch cylinder filling with hydraulic fluid to take up the clearances between the components of the clutch, hydraulic fluid is directed back to the control valve vent port. This action delays engagement of the clutch and operates contrary to the purpose of the multiple source of pressure, i.e., to reduce the period required to engage the clutch.

SUMMARY OF THE INVENTION

The period during which clearance among the friction elements of a clutch is taken up by filling the clutch cylinder and moving its piston against the friction elements is minimized with the present system by preventing any possibility of draining the clutch cylinder, whether through an accumulator control valve or otherwise, while the control valve is regulating fluid pressure to produce regulated output pressure. This improvement results because a vent port in the control valve is closed permanently and the valve regulates output pressure by balancing control feedback pressure against a spring force without venting.

At low temperature, while high viscosity fluid is located within the system, failure of a shuttle ball within the shuttle valve to become seated on a port carrying regulated pressure from the accumulator control valve does not permit the clutch to drain back to the control valve because the vent port is held closed while throttling. Meanwhile, regardless of the position of the shuttle ball, the shuttle valve is held open to one or both sources of supply pressure while the control valve is throttling supply pressure to regulated output pressure.

Moreover, during normal ambient temperature and while low throttle valve pressure conditions exist, the accumulator control valve performs its normal function of regulating output pressure and controlling the time rate of increase of clutch pressure by expanding a first volume of the accumulator at a rate controlled by the magnitude of control pressure within a second volume of the accumulator, the force of a compression spring biasing an accumulator plunger against this expansion of the first volume, and the flow rate through an orifice of predetermined diameter.

BRIEF DESCRIPTION OF THE DRAWINGS

FIGS. 1, 2 and 3 show, at successive stages of operation, a hydraulic circuit according to the present invention for pressurizing a friction element of an automatic transmission from multiple passages containing actuating pressure and a ball shuttle valve. The pressure in one passage is regulated by a control valve.

FIGS. 4, 5 and 6 show progressively a hydraulic circuit in the prior art for directing two sources of hydraulic pressure through a ball shuttle valve to a clutch.

DESCRIPTION OF THE PREFERRED EMBODIMENT

Operation of direct clutch 98 is described in U.S. Ser. No. 217,507, filed July 11, 1988 now U.S. Pat. No.

4,843,917 (the entire disclosure of which is herein incorporated by reference.)

The clutch is hydraulically actuated when passage 286 is pressurized and disengaged when the passage is vented. The clutch is engaged when the transmission operates in third gear, whether the gear be selected manually by the vehicle operator or automatically through operation of a transmission control circuit, fourth gear and reverse gear. While making a gear ratio change and engaging the clutch, which is a friction element actuated by a pressurized hydraulic fluid, a piston, moveable within a hydraulic cylinder, moves friction discs into driving engagement after closing clearance spaces between the friction discs, a load block, and clutch piston. During the period while these clearances within the clutch are closed by movement of the clutch piston against the friction disc pack, pressure within the clutch cylinder remains relatively low because volume of the clutch cylinder is expanding as clearances are removed. However, this period lasts only briefly. Thereafter, pressure rises rapidly within the clutch cylinder, the friction discs are forced into frictional driving contact with a high compression force developing between the clutch piston and reaction load block until the required torque capacity required to be transmitted by the clutch at the completion of the gear ratio change is produced.

The friction element is pressurized through operation of various control valves which connect regulated line pressure to the clutch in accordance with requirements of several control valves. During a shift to reverse drive and while throttle valve pressure is high, a period exists during which several control valves direct pressure to the friction element concurrently. These multiple sources of pressurized hydraulic fluid are directed to the clutch through a single hydraulic passage connected to the outlet of a ball shuttle valve.

Referring first to FIGS. 1–3, passage 168 carries regulated line pressure to an input port of a manual valve 160 controlled by the vehicle operator and moved manually between selected gears and drive ranges the transmission is able to produce. Valve 160 connects regulated line pressure to passages 290 and 310 when reverse drive is selected. A control valve, such as 2-3 shift valve 232, connects passages 290 and 280 when the operator manually selects reverse gear.

However, if TV pressure is high and the manual valve is moved to reverse drive, forward clutch valve 240 concurrently connects line pressure in passage 310 to direct clutch pressure in passage 344. Thus, passages 280 and 344 carry regulated line pressure.

Passage 280, which contains a 0.15 inch diameter orifice 12, connects shift valve 232 to control valve 282 located above accumulator 262. The accumulator includes a hydraulic cylinder 14, a plunger 16 movable along the axis of the cylinder, and compression springs 18 urging the plunger to top of the cylinder. The plunger defines within the cylinder a first volume 22, whose volume decreases as the plunger moves downward, and a second volume 20, whose size expands as the plunger moves downward. Volume 22 is filled with hydraulic fluid at a first control pressure TVLM supplied through passage 272, which acts with springs 18 to force the plunger to top of the cylinder.

Control valve 282 includes a spool 24 movable parallel to the axis of the accumulator, a compression spring 27 urging spool 24 upward, a valve land 26 formed on the spool having a feedback control pressure surface 28, and a vent port 30 through which the valve is connected to a low pressure sump. The control valve includes several additional ports: an inlet port 32 by which passage 280 is admitted to the valve; a regulated output pressure port 34 through which regulated output pressure exits the valve, and a feedback control port 36 connected by passage 38 to the regulated output pressure passage 40, which carries regulated output pressure to shuttle valve 241. The second volume 20 is connected by passage 42 through an orifice 284 of predetermined diameter to regulated output pressure passage 40. The length of land 26 maintains vent port 30 closed at all times regardless of position of spool 24.

Shuttle valve 241 includes regulated pressure input port 44 and port 46, through which the first pressure source, passage 344, enter the shuttle valve. Orifice 15 in passage 344 has a diameter of approximately 0.040 inches. Port 48, through which passage 286 communicates the cylinder of clutch 98 to the interior of the shuttle valve, remains open at all times. Shuttle ball 50, which is moved within the valve by flow of hydraulic fluid through the valve, becomes seated on ports 44, 46 and remains seated due to internal pressure within the valve. For example, when port 44 is sealed by ball 50, passages 286 and 344 communicate. When the ball is seated on port 46, passages 286 and 40 communicate. Normally, the ball moves to a seated or sealing position on the port in which lower hydraulic pressure is present.

FIG. 1 shows the system at the start of clutch actuation when fluid from both circuits supplies shuttle 241 and clutch 98. Control valve 282 regulates pressure at output port 34 by balancing a pressure force on surface 28 against the spring force on the opposite end of spool 24. When pressure in passage 280 and inlet port 32 is low, the valve is in the position shown in FIG. 1, inlet 32 and output 34 are open, and second volume 20 is filled through passage 42 and orifice 284. As pressure fluid source 280 increases, feedback pressure force on surface 28 increases in relation to the force of spring 27, and valve 282 regulates by throttling pressure in passage 280. During the throttling process, spool 24 moves upward and downward within the bore of the valve to the position shown in FIG. 2, where the valve completely closes inlet port 32 and outlet port 34, momentarily disconnecting flow from valve 282 to valve 241 and causing feedback control pressure momentarily to decrease because of expansion of volume 20, while maintaining vent port 30 closed. Valve 282 continues regulation by moving upward due to the effect of the spring and reduced feedback control pressure, thereby opening passage 280 to passage 40 until control feedback pressure produces on pressure surface 28 a force exceeding the spring force, due to increased regulated output pressure. During regulation, fluid entering shuttle valve 241 from passages 40 and 344 through ports 44 and 46 flows to clutch 98.

When valve 282 is regulating, volume 20 of accumulator 262 expands against hydraulic pressure within volume 22 and the effect of compression springs 18 at a rate consistent with the pressure drop across orifice 284. FIG. 3 shows plunger 16 moved to a lower position while filling volume 20 and forcing fluid from the bottom of the accumulator cylinder. At normal operating fluid temperature, the plunger bottoms in about 1.5 seconds.

When the cylinder of clutch 98 is filled with oil and clearances among the clutch elements are removed, sufficient pressure builds in the pocket of shuttle valve 241 to cause the ball to seal port 44, thereby closing communication between valves 241 and 282, as FIG. 3 shows.

At 0° F., it takes about 20 seconds for plunger 16 to reach the lower end of the accumulator. At low temperature, high viscosity hydraulic fluid delays movement of shuttle ball 50 to a seated position on port 44, to which it would move at normal ambient temperature because pressure in passage 40 is lower than line pressure in passage 344 while volume 20 is expanding. However, even at low temperature, high viscous conditions and with the shuttle ball located at an unseated position on either of ports 44, 46, flow from valve 241 toward valve 282 is prevented because vent port 30 is closed by land 26.

A conventional system is illustrated in FIGS. 4-6 at progressive stages of engagement. Here again, during a shift change to reverse gear and at a high throttle valve pressure condition, passages 280 and 344 are supplied at regulated line pressure. As FIG. 4 shows, while the cylinder of clutch 98 is filling with fluid through passage 286 from the pocket of shuttle valve 241, both ports of the valve 241 are unsealed by shuttle ball 50 and control valve 282 is forced by spring 27 to the upper end of its bore, thereby opening passage 280 to passage 40. Valve 282 includes spool 25 having a shorter land 64 than land 26. As output pressure increases, pressure force resulting from feedback control pressure on surface 28 forces spool 25 downward against compression spring 27 until feedback control pressure is open to exhaust vent 30. When this occurs, both output port 34 of valve 282 and port 44 of shuttle valve 241 are opened to vent. At low temperature, high viscosity fluid within shuttle valve 241 prevents shuttle ball 50 from moving immediately to a sealing position on port 44 until after a substantial delay during which shuttle valve 241, passage 344, and the cylinder of clutch 98 are connected through passages 40, 38 and port 36 to vent port 30. FIG. 5 shows control valve 282 continuing to regulate fluid from the pressure source in passage 280 by moving upward due to the effect of spring 27 because control feedback pressure is reduced by opening vent port 30 and by moving downward due to pressure acting on valve surface 28. Fluid flow from the direct clutch to vent lengthens the period during which clearances among the friction elements of the clutch are closed, thereby delaying engagement of clutch 98.

After the cylinder of clutch 98 is filled with fluid through passage 286 and has expanded to close clearances among the friction discs, load block and clutch piston, pressure rises in shuttle valve 241 to seat ball 50 in port 44. This condition is illustrated in FIG. 6. The system including valve 282 and accumulator 262 continues to function as described until plunger 16 completes travel to the bottom of cylinder 14.

Having described a preferred embodiment of my invention, what I claim and desire to secure by U.S. Pat. No. is:

1. A system for supplying hydraulic fluid to a friction element of an automatic transmission, comprising:
    a first source of fluid pressure;
    a second source of fluid pressure;
    a vent port;
    valve means for regulating output of the second pressure source and producing regulated output pressure, including feedback control pressure connected to regulated output pressure, a spool having a control pressure surface connected to feedback control pressure and biased by feedback control pressure to a first position where the second pressure source is closed to regulated output pressure, a spring biasing the spool to a second position where the second pressure source is open to regulated output pressure;
    shuttle valve means having states for opening communication between two members of a group comprising regulated output pressure, the first pressure source and the friction element, and closing communication between mutually communicating members of said group and the other member of said group; and
    means for preventing communication between the vent port and regulated output pressure regardless of the state of the shuttle valve means.

2. The system of claim 1 further comprising:
    an accumulator having a piston moveable within a cylinder defining a first volume located at one side of the piston, a second volume located at a second side of the piston communicating with regulated output pressure, and means for urging the piston to minimize the first volume; and
    means located between regulated output pressure of said valve means and the second volume of the accumulator for regulating the flow rate of fluid between said valve means and said second volume.

3. The system of claim 2 further comprising means for preventing communication between the vent port and said second volume regardless of the state of the shuttle valve means.

4. The system of claim 1 further comprising means for preventing communication between the vent port and said feedback control pressure.

5. The system of claim 1 wherein the shuttle valve means is connected to regulated output pressure, the first pressure source and the friction element, and further including means for connecting the shuttle valve means and feedback control pressure.

6. A system for supplying hydraulic fluid to a friction element of an automatic transmission, comprising:
    a first source of fluid pressure;
    a second source of fluid pressure;
    valve means, including feedback control pressure connected to regulated output pressure, a spool having a control pressure surface connected to feedback control pressure and urged by feedback control pressure to close communication between the second pressure source and regulated output pressure, and means urging the spool against the effect of feedback control pressure to open communication between the second pressure source and regulated output pressure, for throttling output of the second pressure source and producing regulated output pressure in accordance with the magnitude of regulated output pressure without venting either feedback control pressure or regulated output pressure; and
    shuttle valve means having states for opening communication between two members of a group comprising regulated output pressure, the first pressure source and the friction element, and closing communication between mutually communicating members of said group and the other member of said group.

7. The system of claim 6 further comprising:

an accumulator having a piston moveable within a cylinder defining a first volume located at one side of the piston, a second volume located at a second side of the piston communicating with regulated output pressure, and means for urging the piston to minimize the first volume; and means located between regulated output pressure of said valve means and the second volume of the accumulator for regulating the flow rate of fluid between said valve means and said second volume.

8. The system of claim 7 further comprising means for preventing fluid flow from the first pressure source to the valve means.

9. The system of claim 6 further comprising means for preventing fluid flow from the first pressure source to said feedback control pressure surface regardless of the state of the shuttle valve means.

10. A system for supplying hydraulic fluid to a friction element of an automatic transmission, comprising:
a first source of fluid pressure;
a second source of fluid pressure;
valve means, including feedback control pressure connected to regulated output pressure, a spool having a control pressure surface connected to feedback control pressure and urged by feedback control pressure to close communication between the second pressure source and regulated output pressure, and means urging the spool against feedback control pressure to open communication between the second pressure source and regulated output pressure, for throttling output of the second pressure source and producing regulated output pressure in accordance with the magnitude of regulated output pressure and the effect of the urging means but without venting either feedback control pressure or regulated output pressure; and
shuttle valve means having states for opening communication between two members of a group comprising regulated output pressure, the first pressure source and the friction element, and closing communication between mutually communicating members of said group and the other member of said group.

11. The system of claim 10 further comprising:
an accumulator having a piston moveable within a cylinder defining a first volume located at one side of the piston, a second volume located at a second side of the piston communicating with regulated output pressure, and means for urging the piston to minimize the first volume; and
means located between regulated output pressure of said valve means and the second volume of the accumulator for regulating the flow rate of fluid between said valve means and said second volume.

12. The system of claim 11 further comprising means for preventing fluid flow from the first pressure source to the valve means regardless of the state of the shuttle valve means.

13. A method for pressurizing a friction element of an automatic transmission through a shuttle valve having states and supplied with pressurized fluid from a first source of fluid pressure and a second source of fluid pressure comprising the step of:
regulating output of the second pressure source by balancing in a regulator valve regulated output pressure against a spring force without venting the first pressure source or the regulated output pressure;
opening communication between two members of a group comprising regulated output pressure, the first pressure source and the friction element;
closing communication between mutually communicating members of said group and the other member of said group; and
preventing fluid flow from the shuttle valve to the regulator valve regardless of the state of the shuttle valve.

14. A method for pressurizing a friction element of an automatic transmission through a shuttle valve having states and supplied with pressurized fluid from a source of fluid pressure comprising the steps of:
regulating in a regulator valve output of the pressure source by balancing regulated output pressure against a spring force without venting the pressure source or the regulated output pressure;
opening communication between two members of a group comprising regulated output pressure, the pressure source and the friction element;
closing communication between mutually communicating members of said group and the other member of said group; and
preventing fluid flow from the shuttle valve to the regulator valve regardless of the state of the shuttle valve.

15. A method for pressurizing a friction element of an automatic transmission through a shuttle valve having states and supplied with pressurized fluid from a source of fluid pressure comprising the step of:
regulating in a regular valve output of the pressure source by balancing regulated output pressure against a spring force without venting the pressure source or the regulated output pressure;
opening communication between two members of a group comprising regulated output pressure, the pressure source and the friction element;
closing communication between mutually communicating members of said group and the other member of said group; and
defining a first volume located at one side of a piston moveable within a cylinder;
defining a second volume located at a second side of the piston and communicating with regulated output pressure; urging the piston to minimize the first volume; and
regulating the flow rate of fluid between said regulator valve and said second volume; and
preventing fluid flow from the shuttle valve to the regulator valve regardless of the state of the shuttle valve.

16. A method for pressurizing a friction element of an automatic transmission through a shuttle valve having states and supplied with pressurized fluid from a first source of fluid pressure and a second source of fluid pressure comprising the step of:
regulating in a regulator valve output of the second pressure source by balancing regulated output pressure against a spring force without venting the second pressure source or the regulated output pressure;
opening communication between two members of a group comprising regulated output pressure, the first pressure source and the friction element;
closing communication between mutually communicating members of said group and the other member of said group; and defining a first volume located at one side of a piston moveable within a cylinder;

defining a second volume located at a second side of the piston and communicating with regulated output pressure; urging the piston to minimize the first volume; and regulating the flow rate of fluid between said regulator valve and said second volume; and preventing fluid flow from the shuttle valve to the regulator valve regardless of the state of the shuttle valve.

17. A system for supplying hydraulic fluid to a friction element of an automatic transmission, comprising:
a source of fluid pressure;
a vent port;
valve means for regulating output of the pressure source and producing regulated output pressure, including feedback control pressure connected to regulated output pressure, a spool having a control pressure surface connected to feedback control pressure and biased by feedback control pressure to a first position where the pressure source is closed to regulated output pressure, a spring biasing the spool to a second position where the pressure source is open to regulated output pressure;

shuttle valve means having states for opening communication between two members of a group comprising regulated output pressure, the pressure source and the friction element, and closing communication between mutually communicating members of said group and the other member of said group; and means for preventing communication between the vent port and regulated output pressure regardless of the state of the shuttle valve means.

18. A system for supplying hydraulic fluid to a friction element of an automatic transmission, comprising:
a source of fluid pressure;
valve means, including feedback control pressure connected to regulated output pressure, a spool having a control pressure surface connected to feedback control pressure and urged by feedback control pressure to close communication between the pressure source and regulated output pressure, and means urging the spool against the effect of feedback control pressure to open communication between the pressure source and regulated output pressure, for throttling output of the pressure source and producing regulated output pressure in accordance with the magnitude of regulated output pressure without venting either feedback control pressure or regulated output pressure; and shuttle valve means for opening communication between two members of a group comprising regulated output pressure, the pressure source and the friction element, and closing communication between mutually communicating members of said group and the other member of said group.

19. A system for supplying hydraulic fluid to a friction element of an automatic transmission, comprising:
a source of fluid pressure;
valve means, including feedback control pressure connected to regulated output pressure, a spool having a control pressure surface connected to feedback control pressure and urged by feedback control pressure to close communication between the pressure source and regulated output pressure, and means urging the spool against feedback control pressure to open communication between the pressure source and regulated output pressure, for throttling output of the pressure source and producing regulated output pressure in accordance with the magnitude of regulated output pressure and the effect of the urging means but without venting either feedback control pressure or regulated output pressure; and shuttle valve means for opening communication between two members of a group comprising regulated output pressure, the pressure source and the friction element, and closing communication between mutually communicating members of said group and the other member of said group.

* * * * *